United States Patent
Spanjers

(10) Patent No.: US 10,621,355 B2
(45) Date of Patent: Apr. 14, 2020

(54) METHOD FOR INITIALIZING A COMPUTERIZED SYSTEM AND COMPUTERIZED SYSTEM

(71) Applicant: OMRON Corporation, Kyoto (JP)

(72) Inventor: Jasper Spanjers, Den Bosch (NL)

(73) Assignee: OMRON Corporation, Kyoto (JP)

( * ) Notice: Subject to any disclaimer, the term of this patent is extended or adjusted under 35 U.S.C. 154(b) by 221 days.

(21) Appl. No.: 15/867,706

(22) Filed: Jan. 11, 2018

(65) Prior Publication Data
US 2018/0285569 A1 Oct. 4, 2018

(30) Foreign Application Priority Data

Mar. 31, 2017 (EP) ..................................... 17164299

(51) Int. Cl.
| G06F 9/44 | (2018.01) |
| G06F 21/57 | (2013.01) |
| G06F 9/4401 | (2018.01) |
| H04L 9/08 | (2006.01) |

(52) U.S. Cl.
CPC .......... G06F 21/575 (2013.01); G06F 9/4401 (2013.01); G06F 21/572 (2013.01); H04L 9/0825 (2013.01); H04L 9/0897 (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| 9,749,335 B2* | 8/2017 | Boone ....................... G06F 8/65 |
| 9,980,146 B2* | 5/2018 | Raleigh ................. H04W 12/12 |
| 2009/0031409 A1* | 1/2009 | Murray ................ H04N 21/462 726/10 |
| 2010/0185845 A1* | 7/2010 | Takayama ............. G06F 21/575 713/2 |
| 2011/0225409 A1* | 9/2011 | Sibert ................... G06F 21/575 713/2 |
| 2012/0210115 A1* | 8/2012 | Park ...................... H04L 9/3242 713/2 |
| 2014/0317417 A1* | 10/2014 | Ashkenazi ............ H04L 9/0866 713/189 |
| 2014/0331064 A1* | 11/2014 | Ballesteros ......... G06F 12/1408 713/193 |
| 2018/0136943 A1* | 5/2018 | Chew .................. G06F 13/4282 |

* cited by examiner

*Primary Examiner* — Zahid Choudhury
(74) *Attorney, Agent, or Firm* — JCIPRNET

(57) ABSTRACT

A method for initializing a computerized system by executing a boot-script having an associated private security key, wherein the computerized system comprises a first secure storage device for storing a plurality of public keys each having a public key index assigned thereto and a second secure storage device for storing a current key index, wherein the boot-script is only executed if a public key selected from the plurality of public keys is uniquely related to the private security key such as to form a unique key pair with the private security key and has a booting key index having a predetermined relationship with the current key index.

19 Claims, 4 Drawing Sheets

METHOD FOR INITIALIZING A COMPUTERIZED SYSTEM AND COMPUTERIZED SYSTEM

CROSS-REFERENCE TO RELATED APPLICATION

This application claims the priority benefit of European application serial no. 17164299.4, filed on Mar. 31, 2017. The entirety of the above-mentioned patent application is hereby incorporated by reference herein and made a part of this specification.

BACKGROUND

Technical Field

The disclosure relates to a method for initializing a computerized system and to a computerized system.

Description of Related Art

Initializing or booting a system such as a computer needs to be performed securely to guarantee the security of the system. Upon starting, the system usually executes a boot loader for loading the operating system of the computer. For example, a secure boot can be implemented using a TPM (Trusted Platform Module).

SUMMARY

It is one object of the disclosure to provide an improved and more secure method for initializing a computerized system. It is a further object of the disclosure to provide an improved and more secure computerized system.

According to one or some exemplary embodiments, a method for initializing a computerized system by executing a boot-script having an associated private security key $X_i$ is provided, wherein the computerized system comprises a first secure storage device for storing a plurality of public keys $Y_1$-$Y_N$ each having a public key index $k_1$-$k_N$ assigned thereto and a second secure storage device for storing a current key index k. The boot-script is only executed if a public key $Y_i$ selected from the plurality of public keys $Y_1$-$Y_N$ is uniquely related to the private security key $X_i$ such as to form a unique key pair with the private security key $X_i$ and has a booting key index $k_i$ having a predetermined relationship with the current key index k.

According to one or some exemplary embodiments, a computerized system implemented to perform the method described above and below is provided. The computerized system comprises: a first secure storage device for storing a plurality of public keys $Y_1$-$Y_N$ each having a public key index $k_1$-$k_N$ assigned thereto; a second secure storage device for storing a current key index k; a boot-script storage unit for storing a boot-script having an associated private security key $X_i$; and a boot-script execution unit for executing the boot-script only if a public key $Y_i$ selected from the plurality of public keys $Y_1$-$Y_N$ is uniquely related to the private security key $X_i$ such as to form a unique key pair with the private security key $X_i$ and has a booting key index $k_i$ having a predetermined relationship with the current key index k.

Further possible implementations or alternative solutions of the method for initializing the computerized system and of the computerized system also encompass combinations— that are not explicitly mentioned herein—of features described above or below with regard to the embodiments.

The person skilled in the art may also add individual or isolated aspects and features to the most basic form of the invention.

DESCRIPTION OF THE EMBODIMENTS

Figure 1:
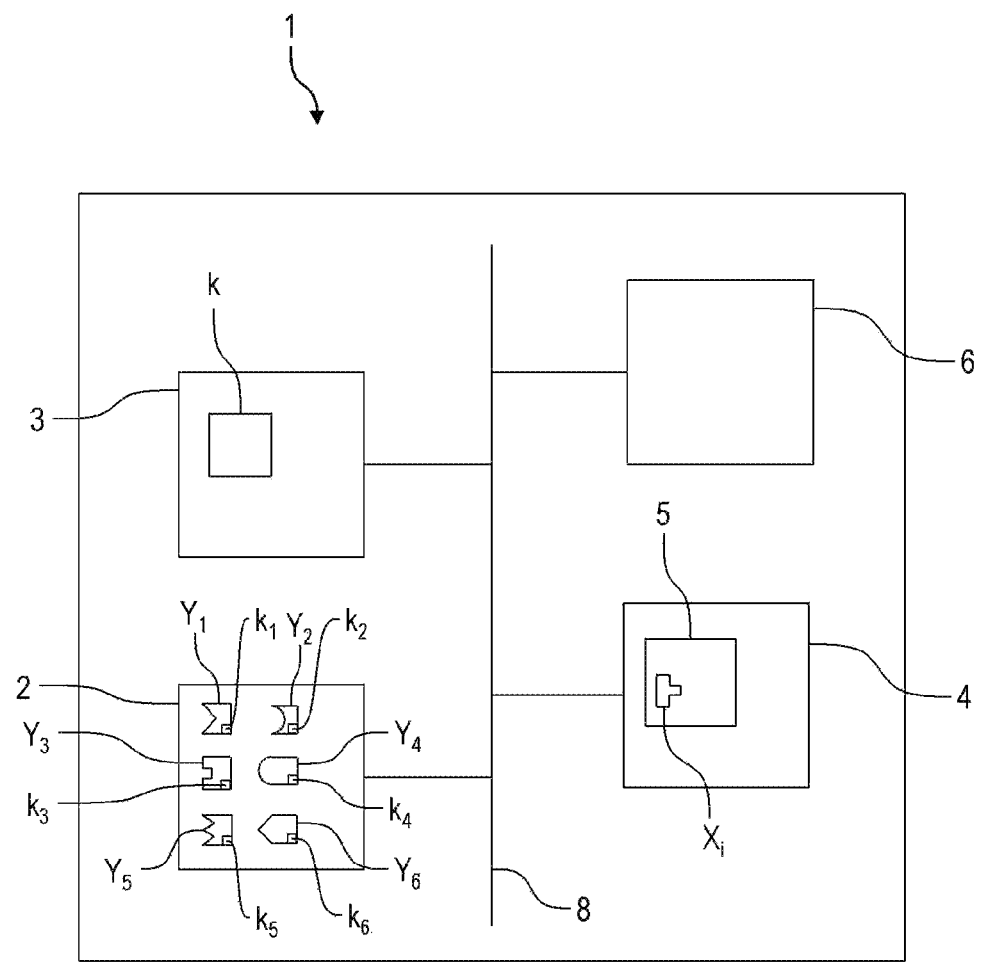
FIG. 1 shows a computerized system according to an embodiment.

According to one or some exemplary embodiments, a method for initializing a computerized system by executing a boot-script having an associated private security key $X_i$ is provided, wherein the computerized system comprises a first secure storage device for storing a plurality of public keys $Y_1$-$Y_N$ each having a public key index $k_1$-$k_N$ assigned thereto and a second secure storage device for storing a current key index k. The boot-script is only executed if a public key $Y_i$ selected from the plurality of public keys $Y_1$-$Y_N$ is uniquely related to the private security key $X_i$ such as to form a unique key pair with the private security key $X_i$ and has a booting key index $k_i$ having a predetermined relationship with the current key index k.

According to one or some exemplary embodiments, a computerized system implemented to perform the method described above and below is provided. The computerized system comprises: a first secure storage device for storing a plurality of public keys $Y_1$-$Y_N$ each having a public key index $k_1$-$k_N$ assigned thereto; a second secure storage device for storing a current key index k; a boot-script storage unit for storing a boot-script having an associated private security key $X_i$; and a boot-script execution unit for executing the boot-script only if a public key $Y_i$ selected from the plurality of public keys $Y_1$-$Y_N$ is uniquely related to the private security key $X_i$ such as to form a unique key pair with the private security key $X_i$ and has a booting key index $k_i$ having a predetermined relationship with the current key index k.

The computerized system may be a system comprising hardware and software such as a computer, in particular a personal computer, embedded systems, industrial computer or a server. The initialization may be a booting process which is necessary for making the computerized system ready for use. The initialization may include executing the boot-script. The boot-script, including its private security key $X_i$ may be created by the manufacturer of the computerized system and stored in the boot-script storage unit of the computerized system.

The private security key $X_i$ associated to the boot-script in particular cannot be retrieved by the computerized system. The private security key $X_i$ may be a signature of the boot-script which needs to be validated or acknowledged before the boot-script can be executed. Alternatively, the private security key $X_i$ may be a cryptographic key. The boot-script and/or the private security key $X_i$ can be modified by the manufacturer of the computerized system, for example.

Before the boot-script can be executed, it needs to be successfully accessed, decrypted, validated or opened by means of a unique public key which is uniquely related to the private security key $X_i$ such as to form a unique key pair therewith. The boot-script cannot be successfully accessed, decrypted, validated or opened if a key different from the unique public key is used.

According to a further exemplary embodiment, the first secure storage device is a TPM, a microcontroller or a field-programmable gate array. The first secure storage device or devices store the plurality of public keys $Y_1$-$Y_N$ therein, with each public key having a public key index $k_1$-$k_N$ assigned thereto. The public keys $Y_1$-$Y_N$ may be distributed along several first secure storage devices to increase the complexity of the computerized system and prevent attacks on the computerized system.

The first secure storage device and/or the second secure storage device may include several memory means each. For example, one can contemplate of a distributed memory structure for storing the keys and/or key indexes. According to alternate embodiments the first and the second secure storage device are integrated into one memory means, as for example a TPM, a ROM, a hard drive, a flash memory device and the like. It is understood that the first and the second secure storage device can be part of one single memory device, for example. In the latter case, one may refer to a secure memory device having sections for storing public keys and sections for storing a current key index.

The key indexes $k_1$-$k_N$ may be integer numbers. The key index may be a label or address for the public keys $Y_1$-$Y_N$. One of the public keys $Y_1$-$Y_N$ may be the public key $Y_i$ which is uniquely related to the private security key $X_i$, as defined above. The remaining public keys stored in the first secure storage device may be of the same format as the public key $Y_i$ which is uniquely related to the private security key $X_i$, but with different contents.

The current key index k may be an integer number. In particular, the current key index k is of the same format as the key indexes $k_1$-$k_N$ of the public keys $Y_1$-$Y_N$. It may also be identical to one of the key indexes $k_1$-$k_N$ of the public keys $Y_1$-$Y_N$. The second secure storage device in which the current key index k is stored may be a RAM, a hard disk or the like given that it would be secured by methods known to the art such as encryption, validation, or the like. In particular, the current key index k may be stored in a flash memory.

There are two requirements for executing the boot-script. Firstly, one of the public keys $Y_i$ selected from the plurality of public keys $Y_1$-$Y_N$ must be uniquely related to the private security key $X_i$ such as to form the unique key pair with the private security key $X_i$. Moreover, said unique public keys $Y_i$ must have a booting key index $k_i$ having a predetermined relationship with the current key index k.

The predetermined relationship may be a mathematical relationship. For example, if the booting key indexes are numbers, the predetermined relationship may be that the booting key index $k_i$ is a multiple of the current key index k, that the booting key index $k_i$ is larger, smaller or equal to the current key index k, that the booting key index $k_i$ falls within a range of the current key index k, that a sum of the booting key index $k_i$ and the current key index k is a predetermined number, and the like. Based on the predetermined relationship, the current key index k may be considered as a black and white list defining the allowed value or values of the booting key index $k_i$.

Since the two requirements described above need to be fulfilled for executing the boot-script, the initializing or booting of the computerized system is performed in a secure manner. That way, an improved method for initializing a computerized system and an improved computerized system are provided. For the user or customer, this provides a guarantee that critical components are not compromised.

Moreover, the above method is a low-cost solution which requires no new components. Indeed, the above method can be performed using solely standard components such as the first secure storage unit, the second secure storage unit, the boot-script storage unit and the boot-script execution unit.

According to a further exemplary embodiment, the method comprises: retrieving one of the plurality of public keys $Y_1$-$Y_N$ from the first secure storage device and verifying whether the retrieved public key forms the unique key pair with the private security key $X_i$; obtaining the key index of the retrieved public key as the booting key index if the retrieved public key forms the unique key pair with the private security key $X_i$; comparing the booting key index with the current key index k; executing the boot-script only if it is determined that the booting key index fulfills the predetermined relationship with the current key index k.

According to a further exemplary embodiment, the step of retrieving one of the plurality of public keys $Y_1$-$Y_N$ from the first secure storage device and verifying whether the retrieved public key forms the unique key pair with the private security key $X_i$ is carried out for each public key of the plurality of public keys $Y_1$-$Y_N$ until the public key $Y_i$ that forms the unique key pair with the private security key $X_i$ is determined.

If the first public key retrieved from the first secure storage device does not form the unique key pair with the private security key $X_i$, another public key is retrieved and it is verified whether this other public key forms the unique key pair with the private security key $X_i$. This is repeated for one public key after another until the public key $Y_i$ that forms the unique key pair with the private security key $X_i$ is determined.

According to a further exemplary embodiment, the plurality of public keys $Y_1$-$Y_N$ are retrieved one after another according to a predetermined sequence. In other words, the predetermined sequence may indicate an order for retrieving the public keys $Y_1$-$Y_N$. For example, the predetermined sequence may indicate that the retrieving order is $Y_1$, $Y_2$, $Y_3$ ... $Y_N$. Moreover, the predetermined sequence may be expressed in terms of the key indexes $k_1$-$k_N$. For example, the public keys are retrieved sequentially in increasing order of key indexes $k_1$-$k_N$.

According to a further embodiment, the method further comprises: interrupting the initialization of the computerized system if it is determined that none of the public keys $Y_1$-$Y_N$ forms the unique key pair with the private security key $X_i$.

In particular, if none of the public keys $Y_1$-$Y_N$ forms the unique key pair with the private security key $X_i$, the boot-script cannot be executed. For example, this corresponds to the case in which the boot-script and/or the private security key $X_i$ thereof has been forged, for example by a malicious user or hacker. Moreover, this may correspond to the case in which it is intended to validate the boot-script using other public key indexes than those stored in the first secure storage unit, or to the case in which the first secure storage unit is hacked.

If none of the public keys $Y_1$-$Y_N$ forms the unique key pair with the private security key $X_i$, the first secure storage unit of the computerized system may lack of the public key $Y_i$ forming the unique key pair with the private security key $X_i$, and the computerized system is not initialized for security reasons. Therefore, the method for initializing the computerized system only allows a secure initialization of the computerized system. Thereby, the overall security of the computerized system is increased. An attack on the computerized system, in particular cold boot attacks, firmware attacks and BIOS keyboard buffer attacks can be avoided.

According to a further embodiment, the method further comprises: issuing a warning signal if it is determined that none of the public keys $Y_1$-$Y_N$ forms the unique key pair with the private security key $X_i$.

The warning signal may be issued to a user of the computerized system to indicate that none of the public keys $Y_1$-$Y_N$ forms the unique key pair with the private security key $X_i$, thereby informing the user of a possible attack of the computerized system. Further, the warning signal may be sent to an external server. Thereby, a security of the computerized system can be further increased.

According to a further exemplary embodiment, the boot-script is only executed if the booting key index $k_i$ is equal to or larger than the current key index k.

In particular, the booting key index $k_i$ and the current key index k satisfy the predetermined relationship according to which boot-script is only executed if the booting key index $k_i$ is equal to or larger than the current key index k. The current key index k may be considered as a black and white list. A boot-script having an associated booting key index that is identified in the corresponding black list is not executed. In particular, all booting index values equal to or larger than the current key index k are part of the white list, for which executing the boot-script is allowable. On the other hand, all booting index values which are strictly smaller than the current key index k may belong to the blacklist, for which executing the boot-script is not allowed.

In embodiments, the method includes a blacklist of blacklist values indicating that the boot script is to be blocked from being executed if the booting key index corresponds to any one of the black-list values. Alternatively, or additionally, the boot script is blocked from being executed if the current key index corresponds to any one of the black-list values.

According to a further exemplary embodiment, the method further comprises: interrupting the initialization of the computerized system if it is determined that the booting key index $k_i$ does not satisfy the predetermined relationship with the current key index k.

In particular, if the booting key index $k_i$ does not satisfy the predetermined relationship with the current key index k, the boot-script cannot be executed. For example, this happens if a malicious hacker has modified the public keys $Y_1$-$Y_N$ stored in the first secure storage device, or has retrieved the public keys $Y_1$-$Y_N$ in an order that does not correspond to the predetermined sequence.

If the booting key index $k_i$ does not satisfy the predetermined relationship with the current key index k, the computerized system may not be initialized for security reasons. Therefore, the method for initializing the computerized system only allows for a secure initialization of the computerized system. Further, the warning signal may be sent to an external server. Thereby, the overall security of the computerized system is increased and an attack on the computerized system can be avoided.

According to a further exemplary embodiment, the method further comprises: issuing a warning signal if it is determined that the booting key index does not satisfy the predetermined relationship with the current key index.

The warning signal may be issued to a user of the computerized system to indicate that the booting key index does not satisfy the predetermined relationship with the current key index, thereby informing the user of a possible attack on the computerized system. Thereby, a security of the computerized system can be further increased.

According to a further exemplary embodiment, the method further comprises: changing the current key index k to the booting key index $k_i$ if it is determined that the booting key index $k_i$ lies within a predefined range.

The value of the current key index k can thereby be changed to the value of the booting key index $k_i$. For example, if the current key index k becomes undesirable in view of an increased attack risk, the system manufacturer may decide to update said current key index k through a firmware update. This may be performed through an update of the boot-script, in particular through assigning a new associated private security key $X_i$ to the boot-script. Said new associated private security key $X_i$ has a uniquely related public key $Y_i$ having a booting key index $k_i$. For example, if the booting key index $k_i$ is strictly larger than the current key index k, the current key index k is changed, modified or updated to the booting key index $k_i$. An update of the current key index k may thereby be performed dynamically. The initial/previous current key index may be blacklisted automatically.

After having changed the current key index k to the booting key index $k_i$, subsequent initializations of the computerized system can only be performed if the booting key index $k_i$ satisfies a predetermined relationship with the changed/updated current key index. Thereby, boot-script signed or encrypted with old private security keys $X_i$ may not be executed, in particular will be blacklisted.

In embodiments, the method comprises at least one of the steps of: adding a value of the current key index to the blacklist after executing the boot script; adding a value of the current key index to the blacklist if the booting key index does not fulfill the predetermined relationship with the current key index; and/or adding a value of the current key index to the blacklist if the retrieved public key does not form the unique key pair with the private security key.

Advantageously, the current key index can be changed/updated easily by a firmware update performed by the system manufacturer, without requiring the user of the computerized system to perform any lengthy updates and/or costly repairs.

According to another exemplary embodiment, the private security key $X_i$ and the public key $Y_i$ are cryptographic keys which interact such that the boot-script encrypted with the private security key $X_i$ can only be decrypted using the public key $Y_i$.

In the exemplary embodiment, the private security key $X_i$ and the public key $Y_i$ are in particular generated simultaneously such as to form a cryptographic key pair. The boot-script cannot be decrypted if a key different from the public key $Y_i$ is used.

For example, the system manufacturer may generate a plurality of cryptographic key pairs, in particular such that each key pair comprises one of the public keys $Y_1$-$Y_N$. The system manufacturer may store all the generated public keys $Y_1$-$Y_N$ in the first secure storage device or devices, sign/encrypt the boot-script with one of the private keys and safely keep at least all the remaining private keys himself.

According to another exemplary embodiment, the private security key $X_i$ is a signature of the boot-script which interacts with the public key $Y_i$ such that the boot-script can only be validated using the public key $Y_i$. The boot-script cannot be decrypted if a key different from the public key $Y_i$ is used.

According to a further aspect, the disclosure relates to a computer program product comprising a program code for executing the method described above and below for initializing the computerized system when run on at least one computer. The program code may be part of a bootloader which loads the operating system of the computerized system during the initialization of the computerized system.

A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

The embodiments and features described with reference to the method for initializing the computerized system apply mutatis mutandis to the computerized system described herein.

In the Figures, like reference numerals designate like or functionally equivalent elements, unless otherwise indicated.

Throughout this disclosure, the expression "storage device", if not defined otherwise in connection with the embodiments, refers to a means capable of memorizing data, as for example a key or key index. Such means can be organized in terms of memory cells or memory sections that can be part of a single hardware device and/or multiple separate devices.

FIG. 1 shows a computerized system 1 according to an embodiment. The computerized system 1 comprises a first secure storage device 2, a second secure storage device 3, a boot-script storage unit 4 and a boot-script execution unit 6, connected to each other via an internal bus 8. The computerized system 1 is here a standard personal computer (PC).

The first secure storage device 2 is a TPM in which a plurality of public keys $Y_1$-$Y_N$ are securely stored. In the present example, 6 public keys $Y_1$-$Y_6$ are stored in the TPM 2. The number of public keys stored in the TPM 2 may be limited by the storage capacity of the TPM 2. The public keys $Y_1$-$Y6$ are here cryptographic public keys, which have been generated by the manufacturer of the computer 1 together with corresponding private key (not represented) such as to form uniquely related cryptographic key pairs. The public keys $Y_1$-$Y_6$ were stored in the TPM 2 by the same manufacturer, while the corresponding private keys were safely kept by the manufacturer.

In FIG. 1, each public key $Y_1$-$Y_6$ is represented as a fraction of a rectangular key pair. The private key corresponding to each of the represented public keys $Y_1$-$Y_6$ has a shape which engages with the shape of the respective public keys $Y_1$-$Y_6$ to form the rectangular key pairs.

To each public key $Y_1$-$Y_6$, there is associated a public key index $k_1$-$k_N$, here $k_1$-$k_6$. The key indexes $k_1$-$k_6$ may be integer numbers scaling from 1 to 6 indicating or labelling the respective public keys $Y_1$-$Y6$. In the present example, the key index $k_1$ takes the value 1 and represents the first public key, namely $Y_1$. Similarly, the key index $k_2$ takes the value 2 and represents the second public key, namely $Y_2$, and so on for the remaining key indexes k3-k6.

One of the generated private keys is used as the private security key $X_i$ to encrypt a boot-script 5 stored in the boot-script storage unit 4. The computer 1 or a user of the computer 1 does not know and has no way of knowing which private key is used to encrypt the boot-script 5.

The computer 1 further comprises the second secure storage device 3, here a ROM, in which the current key index k is stored. The current key index k is here an integer number, in particular any integer number between 1 and 6. In the present example, the current key index k is taken to equal 3.

Figure 2:
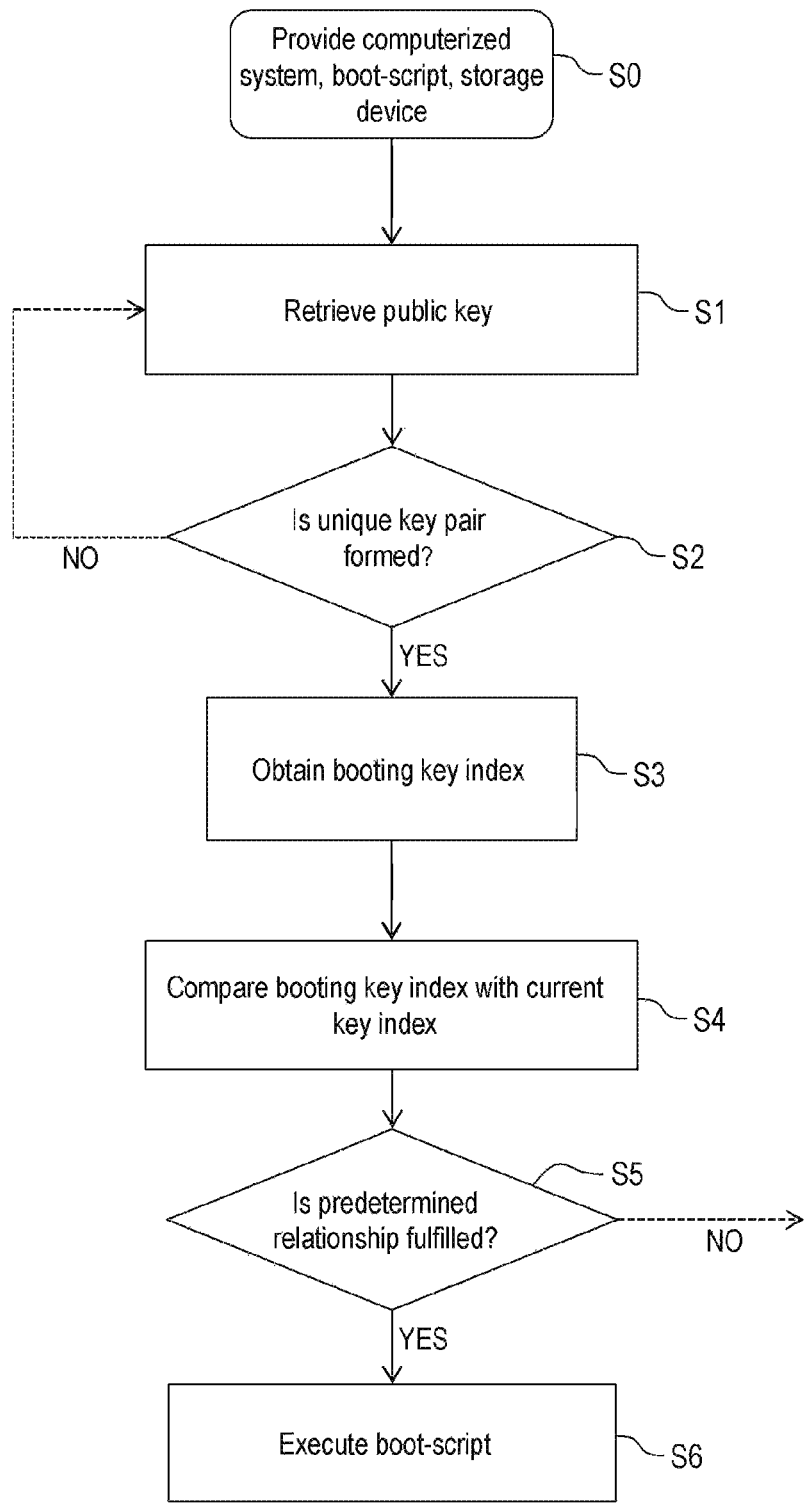
FIG. 2 shows a method for initializing a computerized system according to an embodiment.
Figure 3:
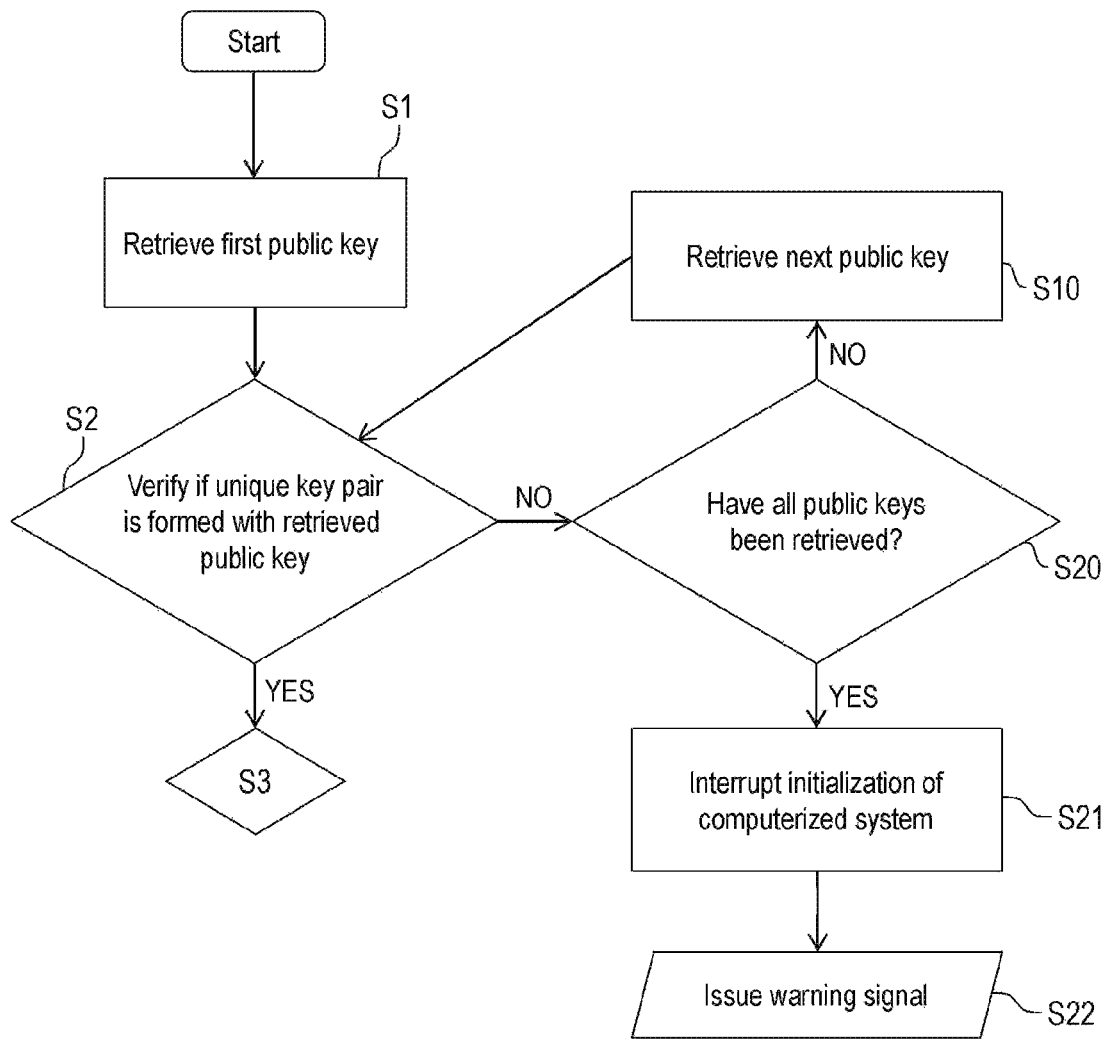
FIG. 3 shows a method for determining a unique key pair according to an embodiment.
Figure 4:
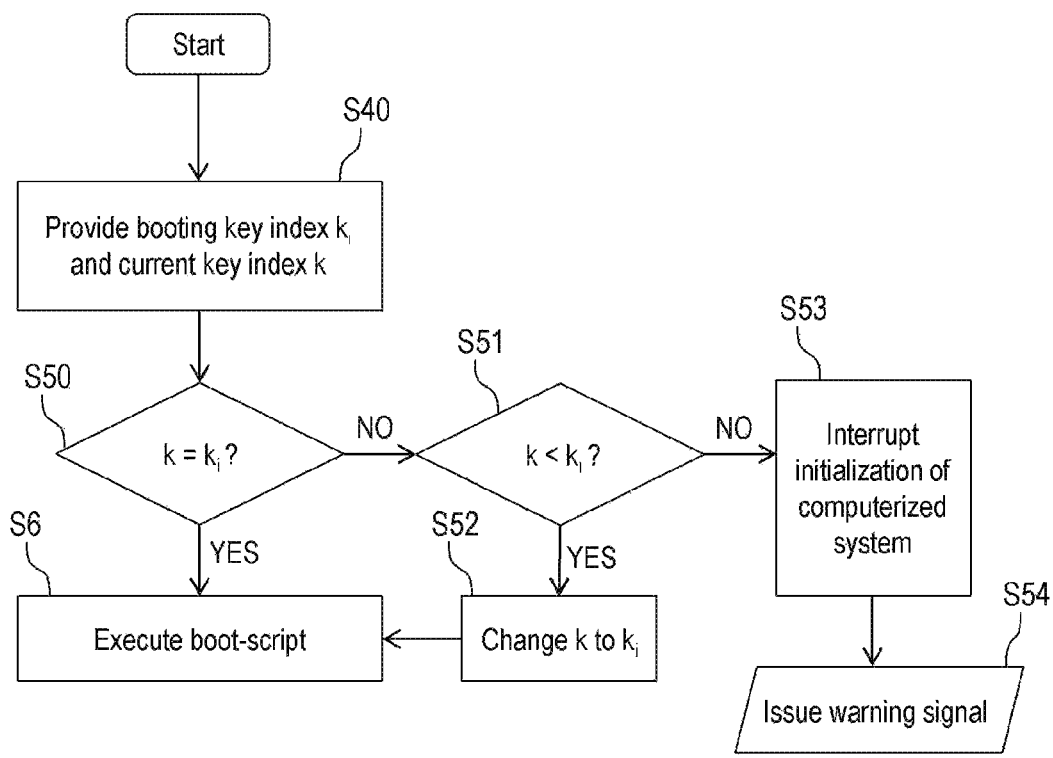
FIG. 4 shows a method for comparing a booting key index with a current key index according to an embodiment.

The computer 1 can be implemented to perform a method for initializing/booting the computerized system 1, in particular the method for initializing the computerized system 1 shown in FIGS. 2-4. Hence, an initialization of the computer 1 is explained below in conjunction with FIGS. 2-4.

In a step S0, the computerized system (computer) 1, including storage devices 2-4 and the boot-script 5 is provided, as shown in FIG. 1.

In a step S1, one public key is retrieved or selected from the plurality of public keys $Y_1$-$Y_6$. For example, the retrieved public key is copied from the TPM 2 and temporarily stored in the boot-script storage unit 4. When determining which public key is retrieved, a predetermined sequence or order for retrieving the public keys $Y_1$-$Y_6$ should be taken into consideration. The step S1 of retrieving the public key will be described in more detail together with the description of FIG. 3 below.

Having retrieved a public key, for example $Y_3$, it is determined in a step S2 whether the unique key pair is formed, namely whether the private key $X_i$ and the retrieved public key $Y_3$ are uniquely related such as to form a cryptographic key pair. Graphically, in FIG. 1, this would correspond to being able to assemble the private key $X_i$ and the retrieved public key $Y_3$ such as to form a rectangle. In the present example, the private key $X_i$ and the retrieved public key $Y_3$ correspond to each other and form the unique key pair. Therefore, the process continues at step S3.

If another public key, for example public key $Y_1$ had been selected, the unique key pair would not have been formed with the private key $X_i$ and the process would have gone back to step S1, where a different public key would have been retrieved from the TPM 2. In other words, the process of retrieving one public key from the TPM 2 and verifying if the unique key pair is formed is performed until the public key $Y_i$ for which the unique key pair is formed is obtained.

Then, at step S3, the key index of the public key $Y_i$ for which the unique key pair is formed is obtained as the booting key index $k_i$. In the above example, the booting key index is $k_3$, which is 3. Information about the value of this booting key index $k_3$ can be stored in the boot-script storage unit 4.

Then, in a step S4, the booting key index $k_3$ is compared with the current key index k. In particular, it is verified if the booting key index $k_3$ is equal, larger or smaller than the current key index k. In a step S5, it is verified if the predetermined relationship is fulfilled. Here, the predetermined relationship to be fulfilled, which is a requirement for the boot-script 5 to be executable, is that the booting key index $k_3$ is larger or equal to the current key index k.

In the present example, the booting key index $k_3$ and the current key index k are equal to each other and have a value of 3. Hence, it is determined that the predetermined relationship is fulfilled, and the process continues at step S6. Alternatively, if the predetermined relationship is not fulfilled, the method for initializing the computer is stopped. This will be explained in detail in conjunction with FIG. 4 below.

At the step S6, the boot-script 5 is executed by the boot-script execution unit 6, which is here a CPU. In particular, the operating system of the computer 1 is loaded and the computer 1 is thus initialized and ready for use.

FIG. 3 shows a method for determining a unique key pair according to an embodiment. In particular, FIG. 3 explains the steps S1 and S2 of FIG. 2 in great detail.

The determination of the unique key pair is here based on the predetermined sequence indicating an order of retrieval of the public keys $Y_1$-$Y_6$ from the TPM 2. The predetermined sequence may be stored in advance in the computer 1, for example in the TPM 2 or in the ROM 3. The predetermined sequence is here a list indicating that the public key $Y_1$ with key index $k_1=1$ should be retrieved first, the public key $Y_2$ with key index $k_2=2$ should be retrieved second, and so on up to public key $Y_6$.

In step S1, the first public key, namely public key $Y_1$ is retrieved from the TPM 2. In step S2, it is verified if the unique key pair is formed. This step is identical to the step S2 detailed above in view of FIG. 2. If it is determined that the key pair is formed, the process continues with step S3 detailed above.

Otherwise, if no key pair is formed, the process continues with a step S20. Therein, it is verified if all public keys $Y_1$-$Y_6$ have been retrieved from the TPM 2 to verify if they form the unique key pair. If not, the process continues at step S10, in which the next public key, for example $Y_2$ is selected in accordance with the predetermined sequence and retrieved from the TPM 2. Again, at step S2, it is verified if the unique key pair is formed.

The steps S20, S10 and S2 are carried out for each public key stored in the TPM 2, until the unique key pair is formed. If the unique key pair is not formed with any of the retrieved keys, it is determined, at step S20, that all public keys $Y_1$-$Y_6$ have been retrieved from the TPM 2 unsuccessfully. The process then continued with step S21, in which the initialization of the computer 1 is interrupted, for example through a command emitted by the CPU 6.

Then, at a step S22, the computer 1 issues a warning signal indicating that the initialization of the computer 1 was stopped due to a lack of public key forming the unique key pair with the private key $X_i$. For example, the warning signal may be emitted to a user of the computer 1 as a light or sound signal. That way, the user becomes aware of the error and security of the computer 1 is guaranteed.

FIG. 4 shows a method for comparing a booting key index with a current key index according to an embodiment. In particular, FIG. 3 illustrates the step S5 of verifying if the predetermined relationship if fulfilled in great detail. Said step may be performed by the CPU 6. In the example of FIG. 4, the predetermined relationship to be satisfied is that the booting key index $k_i$ needs to be larger than or equal to the current key index k. The current key index k white lists all key indexes above itself while blacklisting all key indexes below itself.

Firstly, in a step S40, the booting key index $k_i$, which is obtained from the public key $Y_i$ for which the unique key pair is formed, is provided together with the current key index k, obtained from the ROM 3.

In a step S50, it is verified if the current key index k is equal to the booting key index $k_i$. If so, the boot-script 5 is executed by the CPU 6 as is in the step S6, as detailed above. This corresponds to a normal initialization of the computer 1, without any updates.

If however the current key index k is not equal to the booting key index $k_i$, the process continues at step S51, at which it is verified if the booting key index $k_i$ is larger than the current key index k. This corresponds to the case in which a hardware update was performed by the computer manufacturer with the aim of blacklisting a certain key index to avoid any attacks on the computer.

If the booting key index $k_i$ is indeed larger than the current key index k, the current key index k is changed/updated to the booting key index in a step S52. Only then, the boot-script 5 is executed at the step S6. During the next initialization processes, the booting key index $k_i$ has to satisfy the predetermined relationship with the changed/updated booting key k to allow executing of the boot-script 5.

If it is determined, as step S51, that the booting key index $k_i$ is not larger than the current key index k (namely when the current key index k is larger than the booting key index $k_i$), the process continues with step S53, in which the initialization of the computer 1 is interrupted. This may happen, for example, if an old script or a hacked script is used. The interruption of the initialization of the computer 1 improves the security of the computer 1.

Additionally, in a step S54, the computer 1 issues a warning signal indicating that the initialization of the computer 1 was stopped due to the predetermined relationship not being fulfilled. For example, the warning signal may be emitted to a user of the computer 1 or sent to a central server as a message or as a light or sound signal. That way, the security of the computer 1 is guaranteed.

Although the disclosure has been described in accordance with preferred embodiments, it is obvious for the person skilled in the art that modifications are possible in all embodiments. Secure storage does not imply that particular hardware is to be used. "Secure storage" is to be construed as a device holding trustworthy information or data. For example, any storage units/storage mediums may be used as the first secure storage unit, the boot-script storage unit and the second secure storage unit. It is also understood that the expression "first and/or second storage device" is not intended to specify a specific number of storage devices. Rather, the public keys and/or the current key index can be stored in any suitable memory architecture. Any amount of public keys may be used. The private keys may be stored in a desired amount of first secure storage devices. Any type of public and private keys may be used, not only signatures and encryption/decryption keys. Moreover, the predetermined sequence and the predetermined relationship can be modified in any manner.

The invention is not limited to each embodiment described above, various changes can be made in a range represented in the claims, and an embodiment acquired by appropriately combining technical means disclosed in different embodiments also belongs to the technical scope of the invention.

What is claimed is:

1. A method for initializing a computerized system by executing a boot-script having an associated private security key, wherein the computerized system comprises a first secure storage device for storing a plurality of public keys each having a public key index assigned thereto and a second secure storage device for storing a current key index, the method comprising:

retrieving one of the plurality of public keys from the first secure storage device and verifying whether the retrieved public key forms a unique key pair with the private security key;

obtaining the key index of the retrieved public key as a booting key index if the retrieved public key forms the unique key pair with the private security key;

comparing the booting key index with the current key index; and executing the boot-script only if it is determined that the booting key index fulfills a predetermined relationship with the current key index.

2. The method according to claim 1, wherein the step of retrieving one of the plurality of public keys from the first secure storage device and verifying whether the retrieved public key forms the unique key pair with the private security key is carried out for each public key of the plurality of public keys until the public key that forms the unique key pair with the private security key is determined.

3. The method according to claim 1, wherein the plurality of public keys are retrieved one after another according to a predetermined sequence.

4. The method according to claim 2, further comprising: interrupting the initialization of the computerized system and/or issuing (S22) a warning signal if it is determined that none of the public keys forms the unique key pair with the private security key.

5. The method according to claim 3, further comprising: interrupting the initialization of the computerized system and/or issuing a warning signal if it is determined that none of the public keys forms the unique key pair with the private security key.

6. The method according to claim 1, wherein the boot-script is only executed if the booting key index is equal to or larger than the current key index.

7. The method according to claim 1, wherein the boot-script is only executed if the booting key index is equal to or larger than the current key index.

8. The method according to claim 2, wherein the boot-script is only executed if the booting key index is equal to or larger than the current key index.

9. The method according to claim 3, wherein the boot-script is only executed if the booting key index is equal to or larger than the current key index.

10. The method according to claim 4, wherein the boot-script is only executed if the booting key index is equal to or larger than the current key index.

11. The method according to claim 1, further comprising: interrupting the initialization of the computerized system and/or issuing a warning signal if it is determined that the booting key index does not satisfy the predetermined relationship with the current key index.

12. The method according to claim 1, further comprising: changing the current key index to the booting key index if it is determined that the booting key index lies within a predefined range.

13. The method according to claim 1, further comprising: a blacklist of black-list values indicating that the boot script is to be blocked from being executed if the booting key index and/or the current key index corresponds to any one of the black-list values.

14. The method according to claim 13, further comprising: adding a value of the current key index to the blacklist after executing the boot script; adding a value of the current key index to the blacklist if the booting key index does not fulfill the predetermined relationship with the current key index; and/or adding a value of the current key index to the blacklist if the retrieved public key does not form the unique key pair with the private security key.

15. The method according to claim 1, wherein the first secure storage device includes at least one of a Trusted Platform Module (TPM), a microcontroller or a field-programmable gate array.

16. The method according to claim 1, wherein the private security key and the public key are cryptographic keys which interact such that the boot-script encrypted with the private security key can only be decrypted using the public key.

17. The method according to claim 1, wherein the private security key is a signature of the boot-script which interacts with the public key such that the boot-script can only be validated using the public key.

18. The method according to claim 1, further comprising: updating the boot-script by a firmware update of the computerized system thereby altering the associated private security key.

19. A computerized system comprising:
a first secure storage device for storing a plurality of public keys each having a public key index assigned thereto;
a second secure storage device for storing a current key index;
a boot-script storage unit for storing a boot-script having an associated private security key; and
a processor for retrieving one of the plurality of public keys from the first secure storage device and verifying whether the retrieved public key forms a unique key pair with the private security key, obtaining the key index of the retrieved public key as a booting key index if the retrieved public key forms the unique key pair with the private security key, comparing the booting key index with the current key index, and executing the boot-script only if it is determined that the booting key index fulfills a predetermined relationship with the current key index.

* * * * *